United States Patent
Inagaki et al.

(10) Patent No.: US 6,800,215 B2
(45) Date of Patent: Oct. 5, 2004

(54) LOW-LOSS MAGNETIC OXIDE MATERIAL AND METHOD FOR MAKING

(75) Inventors: Masayuki Inagaki, Tokyo (JP); Yoshio Matsuo, Tokyo (JP); Toshiaki Tomozawa, Tokyo (JP)

(73) Assignee: FDK Corporation, Tokyo (JP)

(*) Notice: Subject to any disclaimer, the term of this patent is extended or adjusted under 35 U.S.C. 154(b) by 0 days.

(21) Appl. No.: 10/445,282

(22) Filed: May 23, 2003

(65) Prior Publication Data

US 2004/0031946 A1 Feb. 19, 2004

Related U.S. Application Data

(63) Continuation of application No. PCT/JP01/09716, filed on Nov. 7, 2001.

(30) Foreign Application Priority Data

Dec. 27, 2000 (JP) .......................................... 2000-397816

(51) Int. Cl.[7] .................................................. H01F 1/34
(52) U.S. Cl. .................................... 252/62.6; 252/62.62
(58) Field of Search .............................. 252/62.6, 62.62

(56) References Cited

U.S. PATENT DOCUMENTS 2,962,445 A * 11/1960 Pierrot et al. ............. 252/62.58

5,711,893 A * 1/1998 Park ........................ 252/62.62

FOREIGN PATENT DOCUMENTS

| JP | 64-9863 A | 1/1989 |
| JP | 1-212234 A | 8/1989 |
| JP | 8-250318 A | 9/1996 |
| JP | 8-268719 A | 10/1996 |
| JP | 9-270314 A | 10/1997 |
| JP | 10-279312 A | 10/1998 |
| JP | 2000-277319 A | 10/2000 |
| JP | 2000-299215 A | 10/2000 |

* cited by examiner

*Primary Examiner*—C. Melissa Koslow
(74) *Attorney, Agent, or Firm*—Martin Fleit; Paul D. Bianco; Fleit, Kain, Gibbons, Gutman, Bongini & Bianco

(57) ABSTRACT

A Ni type ferrite material of a low magnetic loss. The Ni type ferrite material is formed by adding $MnO_2$ in an amount of 0.1 to 10 mol % to a ferrite material of a composition containing $Fe_2O_3$ in 40 to 50 mol %, ZnO in 20 to 33 mol %, CuO in 2 to 10 mol %, and NiO in the remainder. Such Ni type ferrite material is adapted for use in a coil component as a core material because of a smaller magnetic loss in comparison with a prior material, and has a high electric resistance to allow direct coil winding on the core, thereby realizing reduction in both size and weight of the coil component.

2 Claims, 3 Drawing Sheets

LOW-LOSS MAGNETIC OXIDE MATERIAL AND METHOD FOR MAKING

RELATED APPLICATION

This application is a continuation of International Application PCT No. PCT/JP01/09716 filed Nov. 7, 2001, the contents of which are here incorporated by reference in their entirety.

BACKGROUND OF THE INVENTION

1. Field of the Invention

The present invention relates to a magnetic material adapted for use in a transformer, a coil or the like, and more particularly to a magnetic oxide material of a low magnetic loss employing a Ni type ferrite material as a main raw material or ingredient, and a method for making same.

2. Prior Art

Ferrite materials of Mn type (Mn—Zn) or Ni type (Ni—Zn) are known as a core material for a transformer or a coil or the like, but the ferrite material of Mn type has been principally employed. This is because the Mn type ferrite material has a smaller magnetic loss and higher magnetic characteristics in comparison with the Ni type ferrite material. A core of the Mn type ferrite can provide a coil component of a high efficiency.

With the recent significant compactization (or, size reduction) and weight reduction of electronic devices, it is strongly desired, also in such coil component, to be a module which integrates an electronic circuit including a coil as a functional component, and which can be incorporated in another electronic devices (for example an ultra small DC-DC converter, an ultra small inductor, etc.)

However, the Mn type ferrite material, which has been used in the past, though having a low loss and high magnetic characteristics, does not allow direct coil winding on the core because of a low electric resistance, so that the coil has to be formed so as to wind on a bobbin or an insulation sheet, and this fact has been an obstacle to compactization of the coil component. On the other hand, the known ferrite material of Ni type allows direct coil winding on the core because of a higher electrical resistance in comparison with the Mn type and is advantageous for compactization, but the magnetic loss is excessively high for practical use.

SUMMARY OF THE INVENTION

The present invention has been made in consideration of the drawbacks in the related art, and is to provide a Ni type ferrite material of a low magnetic loss.

More specifically, a magnetic oxide material according to a first aspect of the present invention is characterized by being formed by adding $MnO_2$ in an amount of 0.1 to 1 mol % to a ferrite raw material of a composition containing $Fe_2O_3$ in 40 to 50 mol %, ZnO in 20 to 33 mol % and CuO in 2 to 10 mol % and NiO in the remainder.

In a preferred embodiment of the present invention, in the above-mentioned magnetic oxide material, $MnO_2$ is preferably added after a calcination of the ferrite raw material.

In another embodiment of the present invention, the above-mentioned magnetic oxide material preferably has a lattice constant of 8.4090 to 8.4105 Å.

Also in another embodiment of the present invention, the above-mentioned magnetic oxide material preferably has a coercive force at the room temperature of 16 μm or lower and a coercive force at 80° C. of 4 A/m or lower.

In still another embodiment of the present invention, the above-mentioned magnetic oxide material preferably has a sintered density of 5.15 to 5.20 g/cc.

Also in still another embodiment of the present invention, the above-mentioned magnetic oxide material is characterized in having a Curie temperature of 130 to 150° C.

Also in still another embodiment of the present invention, the above-mentioned magnetic oxide material preferably has a particle size of $MnO_2$ of 100 μm or less.

In the aforementioned range of composition, there can be obtained a Ni type ferrite material of a low magnetic loss. This is estimated because an addition of $MnO_2$ to the mother powder reduces a lattice strain in the ferrite crystal with an increase in the content of $MnO_2$, thereby reducing the coercive force and decreasing the hysteresis loss.

DETAILED DESCRIPTION OF PREFERRED EMBODIMENTS OF THE INVENTION

Figure 1:
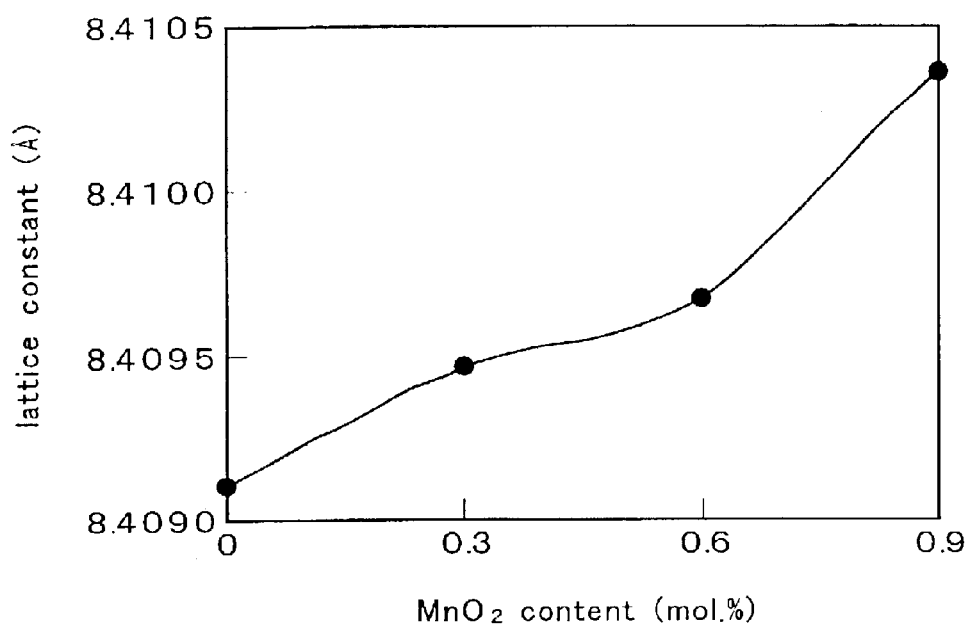
FIG. 1 is a diagram showing a relationship between a content of $MnO_2$ and a lattice constant in NiZn ferrite of the present invention.

In the following, there will be explained preferred embodiments of the present invention.

The present invention provides a magnetic oxide material (NiZn ferrite) formed by adding, to a ferrite raw material of a composition containing $Fe_2O_3$ in 40 to 50 mol %, ZnO in 20 to 33 mol % and CuO in 2 to 10 mol %, $MnO_2$ in an amount of 0.1 to 1 mol % and NiO in the remainder. Such NiZn ferrite has a high electrical resistance and a low magnetic loss and, when used as a core material, enables preparation of a compact and light-weight coil component of a high efficiency.

In the foregoing, the amount of addition of $MnO_2$ is selected as 0.1 to 1 mol % because of following reasons.

In case the amount of $MnO_2$ is less than 0.1 mol %, there is not generated a change in an ion—ion distance. As a result, a core after sintering has a residual stress, which hinders a magnetic domain wall movement and increases the coercive force. As a result, there increases a core loss resulting from a hysteresis loss.

Also in case the amount of $MnO_2$ is more than 1 mol %, the Mn ions added in excess induce an excessively large ion—ion distance, thus resulting in a decrease in the density (cf. FIG. 4) and a strain in the ion lattice. As a result, as in the case of an addition of less than 0.1 mol %, the core after sintering has a residual stress, which hinders a magnetic wall movement to increase the coercive force (FIG. 3), thereby increasing a core loss resulting from a hysteresis loss. For these reasons, it is optimum to select the amount of addition of $MnO_2$ within a range of 0.1 to 1 mol % as described above.

In the following there will be explained a process for producing the NiZn ferrite explained in the foregoing.

In the present embodiment, powders of $Fe_2O_3$, ZnO, NiO, CuO and $MnO_2$ were weighed so as to obtain compositions shown in Table 1, and were wet mixed (or otherwise dry mixed) in a ball mill. After drying, the powder was calcined at 850° C. in the air, and was crushed in a ball mill. After drying, the powder was formed into granules and press formed into a toroidal shape and was fired (sintered) at a temperature of about 1090° C. to obtain a toroidal core having a composition of the samples (A–E), as set forth in Table 1. The calcination mentioned above is executed for a purpose of executing a ferrite forming reaction to a certain level thereby facilitating control of a shrinkage in the succeeding sintering step and of decomposing a raw material which generates a gas when heated. In a preferred variant, the $MnO_2$ is added after calcination of the ferrite raw material. As shown in Table 1, $Fe_2O_3$, ZnO and CuO were maintained at constant amounts within the composition range of the present invention, and NiO was adjusted to a molar ratio replacing $MnO_2$.

TABLE 1

| Sample | (mol %) $Fe_2O_3$ | (mol %) ZnO | (mol %) NiO | (mol %) CuO | (mol %) $MnO_2$ |
|---|---|---|---|---|---|
| A | 49.5 | 31 | 14.5 | 5 | 0 |
| B | 49.5 | 31 | 14.3 | 5 | 0.2 |
| C | 49.5 | 31 | 14.1 | 5 | 0.4 |
| D | 49.5 | 31 | 13.9 | 5 | 0.6 |
| E | 49.5 | 31 | 13.6 | 5 | 0.9 |

The above-mentioned samples (A–E) were evaluated for characteristics, and the results are shown in FIGS. 1 to 5. In the following, there will be considered influences of the addition amount of $MnO_2$ on the crystalline structure and the magnetic characteristics of ferrite, with reference to FIGS. 1 to 5.

FIG. 1 shows a relationship between the amount of $MnO_2$ and the lattice constant. As shown in FIG. 1, in the NiZn ferrite of the invention, an increase in the $MnO_2$ content tends to increase the lattice constant.

Such result is contradictory to an estimation that a mere replacement (substitution) of a $Ni^{2+}$ ion of an ion radius of 0.72 Å with a $Mn^{4+}$ ion of an ion radius of 0.54 Å will decrease the lattice constant. A similar tendency is anticipated also in case of replacement with other metal ions (6-coordination ion radius/$Fe^{3+}$: 0.64 Å, $Zn^{2+}$: 0.74 Å, $Cu^{2+}$: 0.6–0.9 Å).

It is considered that, by the addition of $MnO_2$ powder, the $Mn^{4+}$ ion does not cause a replacement in a metal ion site but is interstitially introduced into the ionic crystal, whereby the ion—ion distance is increased.

For facilitating such interstitial introduction of $Mn^{4+}$ ions, it is advantageous to select $MnO_2$, to be added to the mother powder, at a particle size of 100 µm or less, and it is considered effective to execute the process of adding the $MnO_2$ powder after the calcination.

Figure 2:
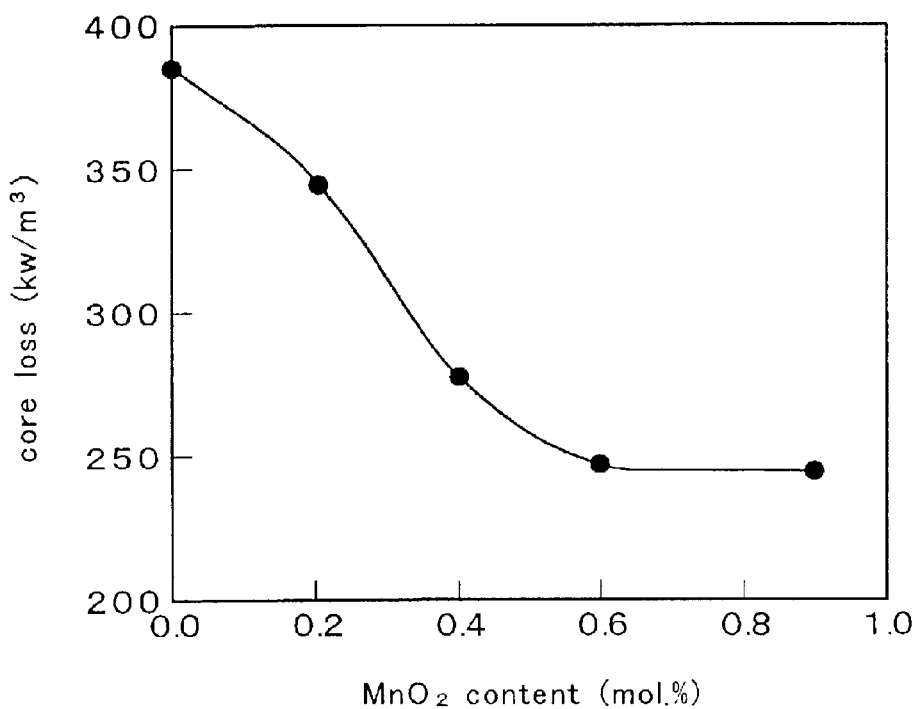
FIG. 2 is a diagram showing a relationship between a content of $MnO_2$ and a core loss in NiZn ferrite of the present invention.

FIG. 2 shows a relationship between the amount of $MnO_2$ and the core loss (50 kHz, 150 mT, 80° C.). As shown in FIG. 2, the core loss decreases with an increase in the amount of $MnO_2$ content, and becomes minimum at a $MnO_2$ content of about 0.6 mol %.

Figure 3:
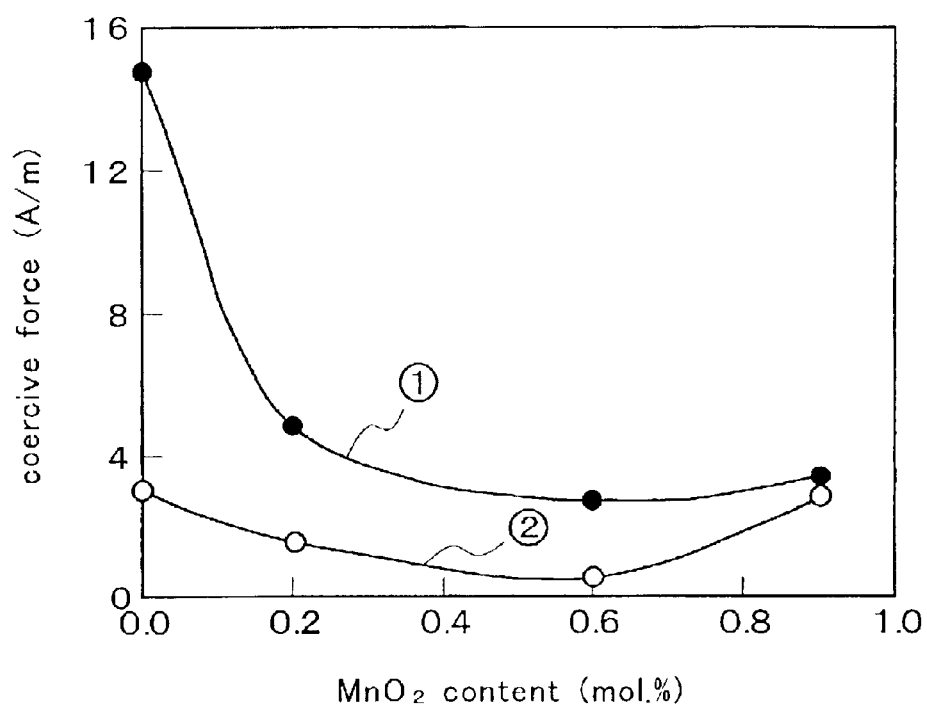
FIG. 3 is a diagram showing a relationship between a content of $MnO_2$ and a coercive force in NiZn ferrite of the present invention.

In order to confirm a cause for this phenomenon, there was measured a change in the coercive force relative to the amount of $MnO_2$, and an obtained result is shown in FIG. 3. In FIG. 3, a curve 1 shows a characteristic in the coercive force at room temperature (25° C.), and a curve 2 shows a change in the coercive force at 80° C. Under either condition, the coercive force became minimum at a $MnO_2$ content of about 0.6 mol %.

Figure 4:
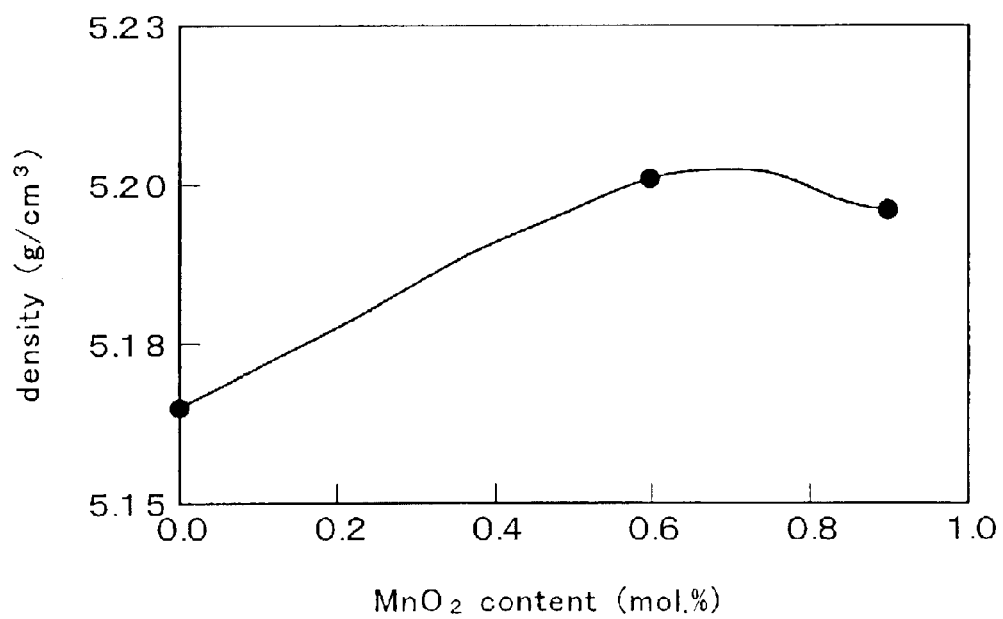
FIG. 4 is a diagram showing a relationship between a content of $MnO_2$ and a sintered density in NiZn ferrite of the present invention.

Also a relationship with the sintered density is as shown in FIG. 4, and the sintered density became maximum at a $MnO_2$ content of about 0.6 mol %. It is therefore known that the preferred sintered density is within a range of about 5.15 to 5.20 g/cc.

It is therefore estimated, from the results shown in FIGS. 3 and 4, that the decrease in the core loss is derived from a decrease in the strain of the ferrite crystal and in the stress of the crystal, resulting from an increase in the $MnO_2$ content.

It is already known that an initial magnetic permeability decreases by an increase in the internal stress or in the coercive force, and such phenomenon arises from a fact that the movement of the magnetic domain wall is hindered by the internal stress. More specifically, an presumably increase in the lattice constant as shown in FIG. 1 relaxes the strain or the stress of ion arrangement constituting a spinel crystal of NiZn ferrite, thereby reducing the coercive force as shown in FIG. 3, whereby the hysteresis loss dependent thereon is reduced to decrease the core loss.

Figure 5:
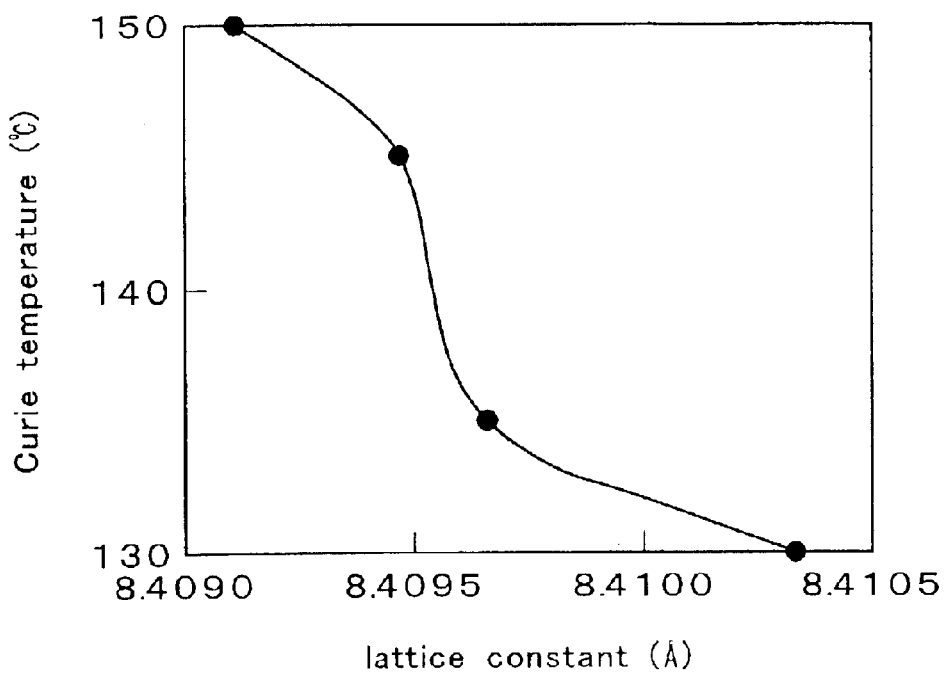
FIG. 5 is a diagram showing a relationship between a content of $MnO_2$ and a Curie temperature in NiZn ferrite of the present invention.

Also based on a relationship between the lattice constant and the Curie temperature shown in FIG. 5, it is confirmed that a change of the $MnO_2$ amount in a range of 0 to 0.9 mol % (namely within a range of lattice constant providing a low core loss) causes a change of the Curie temperature from 130 to 150° C.

Figure 6:
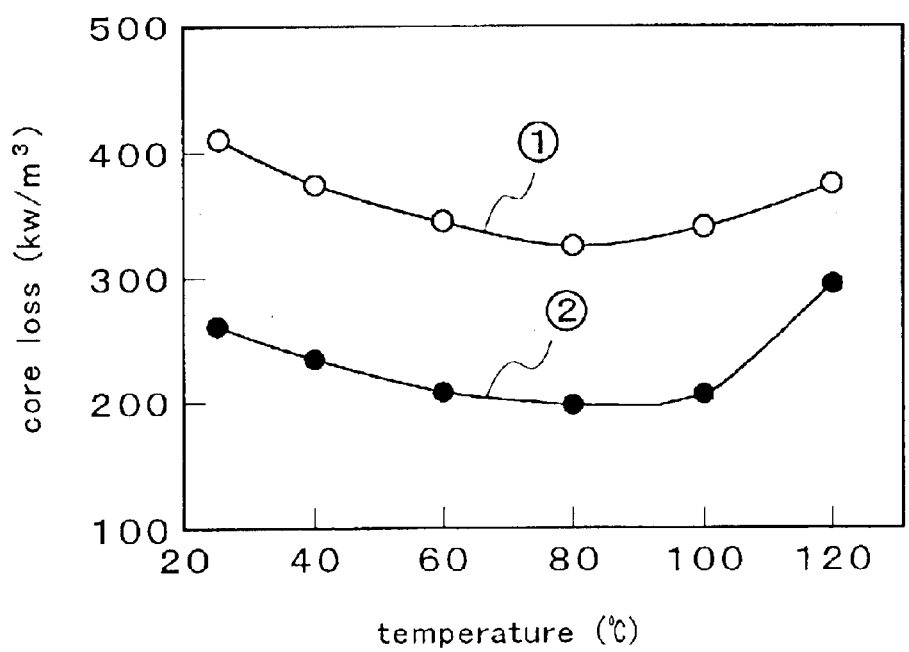
FIG. 6 is a diagram showing a core loss of NiZn ferrite.

In addition to the foregoing knowledge, there can be obtained a magnetic oxide material of a lower loss by optimizing sintering conditions (temperature, atmosphere, time etc.) in the manufacturing process of NiZn ferrite. FIG. 6 shows a comparison of the core loss (50 kHz, 150 mT) between a known NiZn ferrite material shown by marking or curve 1 and a NiZn ferrite material shown by marking or curve 2 of the present invention, and indicates that the present invention achieves a reduction of about 40% in comparison with the known substance.

As explained in the foregoing, the present invention enables significant reduction of the magnetic loss by adding $MnO_2$ to a composition of a known Ni type ferrite material.

Therefore, a ferrite core utilizing such material enables compactization (size reduction) because it has a high resistance, and thereby enables direct coil winding thereon, whereby a compact and light-weight coil component of a high efficiency can be realized, thus contributing sufficiently to the recent trends and streams of compactization and weight reduction of electronic devices.

Although the present invention has been shown and described in terms of specific preferred embodiments, changes are possible without departing from the teachings herein. Such changes are deemed to fall within the purview of the invention as claimed.

What is claimed is:

1. A method of making a low loss magnetic oxide material comprising the step of adding $MnO_2$ in an amount of 0.1 to 1 mol % to a ferrite raw material of a composition containing $Fe_2O_3$ in 40 to 50 mol %, ZnO in 20 to 33 mol %, CuO in 2 to 10 mol % and NiO in the remainder.

2. A method of making a low loss magnetic oxide material comprising the steps of:

Calcining a ferrite containing $Fe_2O_3$ in 40 to 50 mol %, ZnO in 20 to 33 mol %, CuO in 2 to 10 mol %, and NiO in the remainder; and adding $MnO_2$ in an amount of 0.1 to 1 mol % to the ferrite.

* * * * *